United States Patent [19]
Calderini et al.

[11] Patent Number: 5,623,368
[45] Date of Patent: Apr. 22, 1997

[54] PROCESS AND APPARATUS FOR MANUFACTURING NETWORKS OF OPTICAL MICROLENSES

[75] Inventors: Pierre V. Calderini, Montigny sur Loing; Thierry L. A. Dannoux, Avon; Gilbert D. Pujol, Dammarie les Lys; Jean-Pierre Themont, Montigny sur Loing, all of France

[73] Assignee: Corning Incorporated, Corning, N.Y.

[21] Appl. No.: 497,380

[22] Filed: Jun. 29, 1995

[30] Foreign Application Priority Data

Jul. 7, 1994 [FR] France ................... 94 08420

[51] Int. Cl.⁶ .................. G02B 27/10; B29D 11/00
[52] U.S. Cl. ............... 359/619; 359/620; 264/2.5
[58] Field of Search ................. 359/619, 620, 359/900; 264/2.5

[56] References Cited

U.S. PATENT DOCUMENTS

| | | | |
|---|---|---|---|
| 3,538,198 | 11/1970 | Montebello | 359/620 |
| 3,594,457 | 7/1971 | Wright | 359/620 |
| 4,129,628 | 12/1978 | Tamatus | 264/620 |
| 4,306,498 | 12/1981 | Fujimura | 101/333 |
| 4,498,736 | 2/1985 | Griffin | 359/619 |
| 5,255,935 | 10/1993 | Watanabe | 359/620 |
| 5,300,263 | 4/1994 | Hoopman | 264/2.5 |
| 5,439,621 | 8/1995 | Hoopman | 264/2.5 |
| 5,519,539 | 5/1996 | Hoopman | 359/741 |

FOREIGN PATENT DOCUMENTS

| | | | |
|---|---|---|---|
| 58-158280 | 9/1983 | Japan . | |
| 61-152437 | 7/1986 | Japan . | |
| 61-266232 | 11/1986 | Japan . | |
| 1-213603 | 8/1989 | Japan . | |
| 2-175153 | 7/1990 | Japan . | |
| 122614 | 5/1991 | Japan | 359/619 |
| 4-163524 | 6/1992 | Japan | 359/619 |
| 2264890 | 9/1993 | United Kingdom . | |

*Primary Examiner*—Georgia Y. Epps
*Assistant Examiner*—Ricky Mack
*Attorney, Agent, or Firm*—Robert L. Carlson

[57] ABSTRACT

A plate of a deformable optical material is pressed against a rigid surface furrowed with a congruent network of alveoli by subjecting the two faces of the plate to fluid pressures of different values, the pressure on the face opposite the alveolate surface being less than the pressure on the other face of that plate. The alveoli are deeper than the thickness of the convex part of the microlenses formed therein by permanent deformation of the plate under the applied pressure.

9 Claims, 1 Drawing Sheet

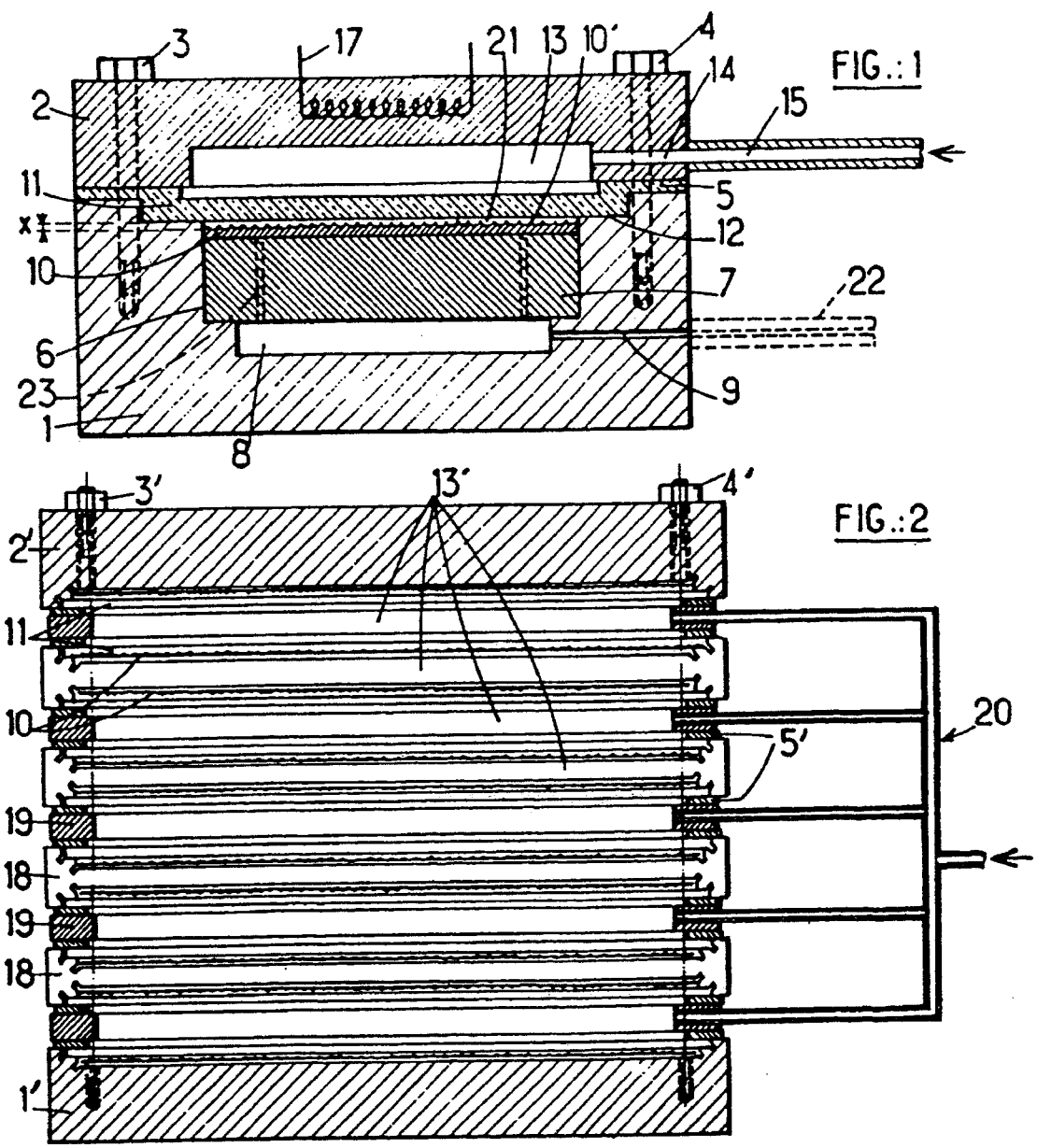
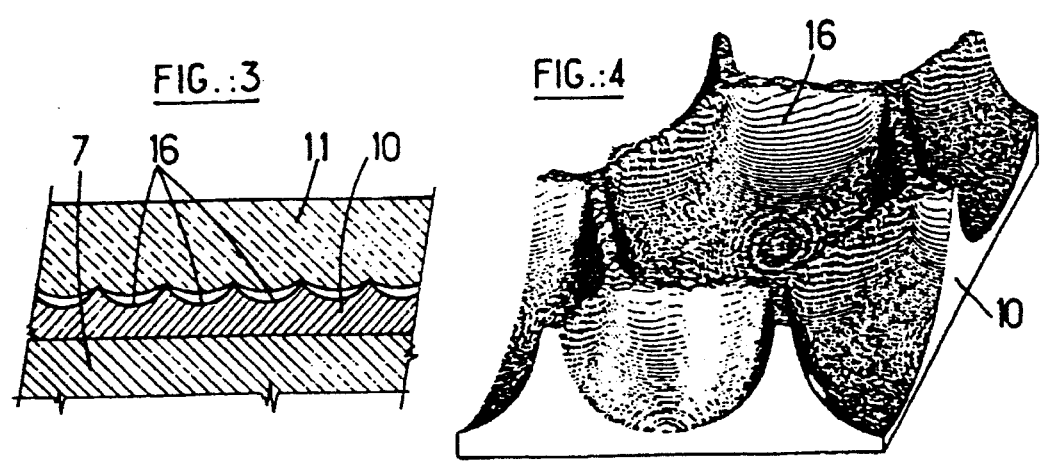

5,623,368

PROCESS AND APPARATUS FOR MANUFACTURING NETWORKS OF OPTICAL MICROLENSES

FIELD OF THE INVENTION

This invention pertains to a process and a device for manufacturing networks of optical microlenses and, more specifically, to such a process according to which a plate of a deformable optical material is pressed against an rigid surface furrowed with a congruent network of alveoli deeper than the thickness of the convex part of the microlenses formed therein by permanent deformation of the plate against the alveolate surface.

BACKGROUND OF THE INVENTION

Networks of microlenses are currently used in diverse applications and, specifically, in image reproducers or sensors. In the former area of technology, video image projectors operate by projecting light through a 2-dimensional matrix of liquid crystal cells that display the image to be projected. These image projectors suffer from a low light yield due to the various light absorptions by polarizers located on either side of the matrix, by the opaque margins of the cells of the matrix, by the projection screen, etc. In this respect, it would be possible to improve the current light yield (on the order of 1%) by a factor of 2 or 3 by focusing the light from a source onto the useful areas of the liquid crystal cells, which are selectively switched between an opaque state and a transparent state. Absorptions by the opaque margins of these cells would thereby be prevented. This problem of absorption is encountered in other apparatuses such as the back-lit liquid crystal screens used in computers for displaying information.

Considering the dimensions of the liquid crystal cell matrixes used and the high definition currently envisioned for video images intended for the general public, we must then have 2-dimensional networks of microlenses distributed with a gauge on the order of 100 µm, for example, the network having a number of lenses ranging from several hundred thousand to several million.

U.S. Pat. No. 4,572,611 makes such a mask using a composition of light-sensitive glass selectively ceramicizable by exposure to short-wavelength radiation, through a mask. The pads exposed contract and the stresses then applied to the unexposed adjacent pads have the effect of causing their surface to be bombarded, in such a way as to form microlenses.

In the application to improve the light yield of liquid crystal cell matrixes for a video image projector, this process is however not perfectly satisfactory, specifically because the coefficient of thermal dilation of the light-sensitive glass used ($89.10^{-7}$ $C^{-1}$, approximately) for making the network is very different from the one ($46.10^{-7}$ $C^{-1}$, approximately) of the glass that is today generally used for making the chamber of the liquid crystal cell matrix. We understand that a differential dilation of those glasses is able to disturb the rigorous alignment that must be maintained between each microlens and the cell of the matrix on which it must remain centered.

We are also familiar with a process for making networks of microlenses by ion exchange in a glass substrate. Unfortunately, the glass of the substrate has a coefficient of thermal dilation of the same order as that of the light-sensitive glass indicated above, resulting in the same problems of differential thermal dilation.

We also know how to make networks of microlenses by mechanical pressing of a plate of an optical material against a mold that precisely reproduces, in impression form, the surface of the network of microlenses. These processes have the disadvantage of requiring the construction of molds that are very delicate, and therefore expensive, to manufacture, with reduced longevity due to the fact that it is not possible to reuse such a mold once minimal alterations in its surface make it impossible to produce networks of lenses with an optical finish surface.

To make up for this last disadvantage, we are also familiar, from English patent No. 2,264,890, with a process for manufacturing networks of small-dimension lenses (1 to 2 mm in diameter) according to which a sheet of optical material (e.g. a polycarbonate, made plastic by heating) is pressed against a stainless steel plate pierced with a network of circular openings distributed and conformed like the contours of the lenses of the network to be produced. Under the effect of the pressure exerted on the sheet of optical material, it protrudes into the openings, assuming the bulge of a convex lens. Since the openings traverse the steel plate, with a thickness greater than that of the lenses to be formed, the bulging surfaces of the lenses do not come into contact with the steel plate and so cannot be altered by mechanical contact. Conversely, the face of the sheet of optical material that is opposite the one that bears the lenses is in physical contact, under pressure, with a sheet of glass or stainless steel that can deteriorate over time and print a replica of its surface defects onto the opposite face of the sheet of optical material. This is a disadvantage, specifically if we envision integrating the network of lenses into a glass plate comprising one of the walls of the chamber of a matrix of liquid crystal cells, which wall must have an optical finish so as not to disturb the functioning of the cells.

Therefore, the purpose of this invention is to make a network of microlenses having an optical finish on both of its faces.

The purpose of this invention is also to make such a network, designed to be combined with or incorporated into a matrix of liquid crystal cells for a video image projector or back-lit information display screen.

SUMMARY OF THE INVENTION

We achieve these aims of the invention, and others that will be revealed by reading the following description, with a process for manufacturing a network of optical microlenses, of the type in which a plate of deformable optical material is pressed against an undeformable surface furrowed with a congruent network of alveoli deeper than the thickness of the convex part of the microlenses formed therein by permanent deformation of the plate against the alveolate surface. According to the invention, the plate is pressed against the alveolate surface by subjecting the two faces of the plate to fluid pressures of different values, the pressure on the face opposite the alveolate surface being less than the pressure on the other side of that plate.

Due to the invention, neither the convex surfaces of the microlenses nor the surface of the plate of optical material that is opposite the one that bears the microlenses enter into contact with surfaces able to alter them. It is then possible to use such a plate to form a part of the chamber of a matrix of liquid crystal cells.

For implementing this process of manufacturing networks of microlenses, the apparatus preferably consists of a) at least one fluid-tight chamber, b) means of supporting the plate made of an optical material and a sheet with alveolate surface, parallel and close to each other, the plate then comprising a component of the wall of the chamber and c) means for establishing, in the chamber, a fluid pressure of a value different from the pressure prevailing on the face of the plate opposite the one that defines the chamber, so that this plate is pressed against the alveolate surface when said means of exerting pressure are activated.

Means of heating the plate of optical material are incorporated into the device according to the invention, to bring this plate to a temperature at which it can undergo plastic deformations when it is pressed against the furrowed surface.

BRIEF DESCRIPTION OF THE DRAWINGS

FIGS. 1 and 2 illustrate, schematically, first and second methods of executing the device for implementing the process according to the invention, respectively.

FIG. 3 is a schematic view useful for explaining the process implemented by the devices of FIGS. 1 and 2.

FIG. 4 shows a detail of the structure of a shaping tool used in the process according to the invention.

DETAILED DESCRIPTION OF THE INVENTION

FIG. 1 illustrates one method of making a device for implementing the manufacturing process according to the invention. A base 1 and a cover 2 assembled by a set of bolts 3, 4 with interposition of a joint 5, made of graphite for example. The base 1 has a hollowed part 6 with a removable metal block 7. The bottom 8 of the hollowed part 6 communicates with the atmosphere by a channel 9 which makes it possible to evacuate the air when the block 7 is put in place in the hollowed part 6. A metal sheet 10 rests removably on the upper face of block 6 which forms a rigid support for that sheet. The free surface 10' of the sheet 10 is furrowed with a regular 2-dimensional distribution of alveoli, as we will see later.

A plate 11 made of an optical material is arranged in parallel fashion and at a short distance x from the surface 10' of the metal sheet 10 which is furrowed with alveoli, by resting on a step 12 formed in the base 1, at the outlet of the hollowed part 6. The cover 2 is also hollowed so as to define, with the plate 11, a chamber 13 closed by the joint 5, which is applied onto the plate 11 when the bolts 3, 4 tighten the cover 2 on the base 1. The chamber 13 communicates selectively by a bore hole 14 and a conduit 15 with a source of fluid under variable pressure (not shown).

The metal sheet 10 constitutes, as indicated below, a shaping tool for shaping microlenses on the surface opposite the plate 11. FIG. 4 shows a partial perspective view of the surface 10' of the sheet 10, the depth of the alveoli being exaggerated. FIG. 4 shows that the alveoli 16 mesh with each other according to a 2-dimensional structure like a beehive.

The device shown in FIG. 1 also has, if necessary, means of heating 17 for bringing the plate 11 to a temperature where it has a sufficient plasticity to be able to undergo deformations, which become permanent after cooling. These means 17 can be comprised of electrical resistances incorporated into the base 1 and/or the cover 2, when made of a metal material that is a good conductor of heat. The means of heating can also take the shape of an oven into which the device shown in FIG. 1 is placed, equipped with the sheet 10 and the plate 11.

We will now describe one embodiment for manufacturing a network of microlenses according to the invention, with reference to FIGS. 1, 3 and 4.

After heating of the plate 11 to the temperature where it has the required plasticity, the chamber 13 is subjected to pressure using a fluid such as an inert gas, e.g. nitrogen, to prevent any oxidation of the metal parts of the device, at high temperature. Under the effect of the pressure applied (e.g. a few bars), the plate 11 is deformed and applied against the surface 10' of the metal sheet 10, itself flatly supported on the block 7, as shown schematically in cross-section in FIG. 3. In this figure, we see that the material of the plate 11 penetrates into the alveoli 16 by assuming a bulge conforming to that of the convex surfaces of the microlenses that we wish to produce. By using a sheet 10 furrowed with alveoli of sufficient depth and by adjusting the temperature of the plate and the fluid pressure applied, a network of microlenses is thereby formed on the surface of the plate 11 without, according to the invention, the surface of that plate coming into contact with the bottom of the alveoli (see FIG. 3). The convex surfaces of the microlenses then advantageously have an optical finish, and any defects in the surface of the alveoli cannot then be carried over by casting onto its convex surfaces. Again advantageously, it is then possible to machine the surface of the alveoli with much less care than would be required by the machining of alveoli in which the material of the microlenses would be cast by conventional methods.

It also appears that, due to the usage of fluid pressure to press the plate 11 against the sheet 10, the face of that plate 11 that is opposite the face bearing the microlenses itself retains an optical finish, in the absence of any contact with a mechanical piece that could otherwise imprint the defects of its surface condition onto it.

With alveoli 10 to 25 μm deep, it has been possible to obtain, according to this invention, networks of microlenses exhibiting a bulge several μm thick, the focal distance of the microlenses obtained, on the order of mm, varying by only ±25 μm.

The network of microlenses obtained by implementing this invention is then perfectly suited to being combined with a matrix of liquid crystal cells to improve the light yield thereof or even to be integrated into that matrix as a wall of the chamber containing the liquid crystals, due to the perfect surface condition of the flat face of the network, which must be turned toward the inside of that chamber.

The sheet 10 can be manufactured using conventional engraving and masking techniques. We start with a sheet of stainless steel that is highly stable in terms of temperature, e.g. a sheet made of Inconel 600 or 625 or Hastelloy X or 750 supplied by the Teledyne Rodney Metal company in the United States.

The sheet covered with a conventional light-sensitive resin is exposed to a honeycomb-structured mask, for example, the basic motif of which is suited to the formation of microlenses of 100 μm in average diameter for example. The mask thereby bears up to several million motifs over a surface in conformity with the surface of a matrix of liquid crystal cells with which it must be combined.

After masking and skinning, the engraving is done in approximately 40 seconds with perchloride of iron and a depassivation acid, in the case of Inconel, for example. Alveoli are obtained for which we can regulate the depth from 10 to 25 μm, for example, without the surface state of the alveoli being critical, as indicated above.

Various organic or inorganic optical materials can be used to make the plate 11. Thus, polycarbonate or polymethylmethacrylate can be used. We can advantageously also use mineral glass and, particularly, the ones referenced 7059 in the catalogs of the applicant company, which glass is used for manufacturing liquid crystal cell matrix to integrate a network of microlenses into such a matrix.

The heating of such glass to bring it to the necessary plasticity (viscosity on the order of $10^9$ poises) is obtained by linear increase in temperature to approximately 740°. The plate 11 is then pressed against the sheet 10 for about 10 min by nitrogen under 5 bars of pressure, injected into the chamber 13. After cooling, a mechanical microscope scan reveals bulges of microlenses of homogeneous thickness, for example, in the range of 6–10 μm.

This invention enables the making of networks of extended-surface microlenses, e.g. 200 mm×300 mm, which can then be cut to the format of the matrixes of liquid crystal cells to be equipped, these networks not having any defect such as those due to the trapping of air bubbles when pressure is applied. Indeed, due to the space x, from 1 to 4 mm for example, arranged between the plate 11 and the sheet 10, contact between them is established, when pressure is applied, at the center, which has the effect of gradually pushing the air out toward the periphery of their interface.

Preferred materials for the glass of the plate 11 and the metal of the base 1 include materials that have coefficients of thermal dilation as close to each other as possible. In that respect, it must be noted that the alloy Fe/Ni N 42 from the IMPHY company has a coefficient of thermal dilation of $46.10^{-7} C^{-1}$, which is exactly the same as that of the glass 7059 cited above from CORNING INCORPORATED. The material of the sheet 10 and that of the plate 11 can advantageously have different coefficients of thermal dilation to facilitate their separation after the network of microlenses is formed.

It now appears that this invention enables the manufacture of networks of high-precision microlenses that have a high-quality optical finish on both their faces, at a low production cost. The cost of manufacturing the networks can be further diminished by using a device such as the one shown in FIG. 2, which enables the simultaneous manufacture of several networks. To that end, this device has a base 1' and a cover 2' between which are stacked alternately supports 18 and braces 19, with interposition of graphite joints 5'. Each support 18 has two pairs of plate 11/sheet 10 arranged as in FIG. 1, on two opposite faces of the support. Each brace 19 defines a chamber 13', between two supports and in cooperation with two plates 11 opposite them. All chambers 13' are connected to the same source of pressurized fluid (not shown) by a connection network 20. The stack of supports and braces thus constituted is anchored together by bolts 3', 4' and heated as described in connection with FIG. 1. It is understood that, if the device of FIG. 2 has n chambers, its production is multiplied by (n+1) compared to the production of the device in FIG. 1.

The invention makes it possible to achieve the set objectives, i.e. to manufacture networks of microlenses of high optical quality, suitable for combination or incorporation into a matrix of liquid crystal cells, with a low production cost suitable for manufacturing devices such as video image projectors intended for the general public or liquid-crystal back-lit information display screens.

Of course, the invention is not limited to the methods of execution described and illustrated, which have been given purely as examples. It extends to any device designed to subject the two faces of the plate 11, heated to a predetermined temperature, to fluid pressures of different values for a predetermined time interval, to press the plate 11 against the alveolate surface. Thus, to do that, we can also depress the chamber 21 (see FIG. 1) delimited by the plate and the alveolate surface facing it, using a vacuum pump connected to the channel 9 by a conduit 22 (indicated by a dotted line on FIG. 1). To facilitate the suction of the volume of air from the chamber 21 by the vacuum pump, channels 23 are pierced into the mobile block 7 and thinner channels are pierced through certain alveoli in the sheet 10. The depression thus made by the vacuum pump in the chamber 21 may be absolute 0.8 bar, while the chamber 13 is brought to atmospheric pressure so that the plate 11, appropriately heated, may be applied against the alveolate surface 10' of the sheet 10.

Although the invention has been described in detail for the purpose of illustration, it is understood that such detail is solely for that purpose and variations can be made therein by those skilled in the art without departing from the spirit and scope of the invention which is defined by the following claims.

For example, although described above in its applications to image reproducers, the invention obviously also has application to the making of image sensors such as the bars of such sensors used in fax machines to focus image elements onto the sensitive surfaces of the sensors.

What is claimed is:

1. A process for manufacturing a network of optical microlenses, according to which a plate (11) of a deformable optical material is pressed against an undeformable surface (10') furrowed with a congruent network of alveoli (16) deeper than the thickness of the convex part of the microlenses formed therein by permanent deformation of the plate against the alveolate surface (10), comprising, using a pressing device, pressing the material against the alveolate surface (10') by subjecting the two faces of the plate (11) to fluid pressure of different values, the pressure on the face opposite the alveolate surface (10) being less than the pressure on the other face of that plate (11), said pressing device comprising a) at least one fluid-tight chamber (13; 13';21), b) means of support (12, 7) of the plate (11) of optical material and a sheet (10) with alveolate surface (10'), parallel and close to each other, the plate comprising a component of the wall of the chamber, and c) means (15; 20; 23) for establishing in the chamber a fluid pressure of a value different from the pressure prevailing on the face of the plate (11) opposite the one that defines the chamber so that the plate is pressed against the alveolate surface when said pressurizing means are activated.

2. The process according to claim 1, characterized in that the plate (11) of optical material is heated to a temperature at which this material is plastically deformable, before pressing the plate against the alveolate surface (10') and the plate is left to cool after the pressing.

3. The method of claim 1 wherein the optical material is glass.

4. The method of claim 1 wherein said device includes means for heating (17) the plate (11) made of optical material, to bring that plate to a temperature at which it can undergo plastic deformations when pressed against the alveolate surface (10').

5. The method of claim 4, wherein the means of support (12) of the plate maintain it at a predetermined distance (x) from the alveolate surface (10'), in the absence of pressurized fluid in the chamber, this distance being calculated so that, when the chamber is pressurized, contact between the plate and said surface is established and extends gradually out from their corresponding central parts.

6. The method of claim 1, wherein said alveolate surface (10') is formed by engraving a metal sheet, the depth of the engraving being less than the thickness of the sheet and greater than the thickness of the convex part of the microlenses to be formed.

7. The method of claim 1, wherein said device has several chambers (13') superimposed, each delimited by two plates (11) of optical material facing each other and each arranged alongside a corresponding alveolate surface (10'), the means of injecting fluid (20) into such chambers (13') functioning in parallel fashion.

8. Matrix of liquid crystal cells for apparatuses in the group comprised of video image projectors and back-lit display screens used in computers, characterized in that it has a network of microlenses manufactured by the process of claim 1.

9. Matrix pursuant to claim 8 wherein said network is integrated into a glass chamber enclosing the cells of the matrix.

* * * * *